United States Patent
Gurney et al.

(10) Patent No.: US 8,824,084 B1
(45) Date of Patent: Sep. 2, 2014

(54) PERPENDICULAR MAGNETIC RECORDING DISK WITH PATTERNED SERVO REGIONS AND TEMPLATED GROWTH METHOD FOR MAKING THE DISK

(71) Applicant: HGST Netherlands B.V., Amsterdam (NL)

(72) Inventors: Bruce Alvin Gurney, San Jose, CA (US); En Yang, Los Altos, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/263,132

(22) Filed: Apr. 28, 2014

(51) Int. Cl.
  *G11B 5/65* (2006.01)
  *G11B 5/09* (2006.01)

(52) U.S. Cl.
  USPC .............................. 360/55; 360/39; 428/836

(58) Field of Classification Search
  None
  See application file for complete search history.

(56) References Cited

U.S. PATENT DOCUMENTS

| | | | |
|---|---|---|---|
| 8,252,153 B2 | 8/2012 | Albrecht et al. | |
| 2008/0180843 A1* | 7/2008 | Zhang et al. | 360/135 |
| 2009/0166184 A1* | 7/2009 | Zhou et al. | 204/192.11 |
| 2010/0273028 A1 | 10/2010 | Dobisz et al. | |
| 2011/0212347 A1* | 9/2011 | Albrecht et al. | 428/836 |
| 2013/0081937 A1 | 4/2013 | Albrecht | |
| 2013/0155543 A1 | 6/2013 | Honda et al. | |

* cited by examiner

*Primary Examiner* — Muhammad N Edun
(74) *Attorney, Agent, or Firm* — Thomas R. Berthold

(57) ABSTRACT

A perpendicular magnetic recording disk has servo regions that have a patterned underlayer with seed layer pillars formed on the underlayer pillars above the underlayer trenches. The underlayer is made of an oxidizable material. Magnetic recording material is located on the seed layer pillars and on an oxide layer in the underlayer trenches. The magnetic material in the trenches exhibits a magnetic field substantially less than the magnetic field exhibited by the magnetic material on the seed layer pillars, which has perpendicular magnetic anisotropy. The reduced magnetic field from the trenches results from structural differences between the magnetic material on the seed layer pillars and in the trenches, such as smaller grain size of the magnetic material on the seed layer pillars and a wider distribution of crystallographic axes of the magnetic material in the trenches. The seed layer may be made of a material substantially non-reactive with oxygen.

20 Claims, 7 Drawing Sheets

PERPENDICULAR MAGNETIC RECORDING DISK WITH PATTERNED SERVO REGIONS AND TEMPLATED GROWTH METHOD FOR MAKING THE DISK

BACKGROUND OF THE INVENTION

1. Field of the Invention

This invention relates generally to patterned perpendicular magnetic recording media, (also called bit-patterned media or BPM), such as disks for use in magnetic recording hard disk drives (HDDs), and more particularly to BPM disks wherein the data bits are stored on elevated magnetic data islands or pillars isolated from one another by recessed trenches.

2. Description of the Related Art

Magnetic recording hard disk drives with patterned magnetic recording media (also called bit-patterned media or BPM) have been proposed to increase data density. In patterned media the magnetic recording layer on the disk is patterned into small isolated data islands arranged in concentric data tracks such that there is a single magnetic domain in each island or "bit". The single magnetic domain can be a single grain or consist of a few strongly coupled grains that switch magnetic states in concert as a single magnetic volume. This is in contrast to conventional granular media wherein a single "bit" may have multiple weakly coupled magnetic grains separated by grain boundaries. BPM disks may be perpendicular magnetic recording disks, wherein the magnetization directions are perpendicular to or out-of-the-plane of the recording layer.

In one approach for making BPM disks, all of the layers up through and including the magnetic recording layer are deposited as films on the substrate. The disk is then lithographically patterned, such as by nanoimprinting, after which the disk is etched down through the recording layer to form the individual data islands. However, this can lead to degraded magnetic properties of the islands due to damage from the etching and from removal of the resist material after etching.

In another approach for making BPM disks, sometimes called templated growth, the layers up to but not including the magnetic recording layer and its underlayers (called the magnetic stack) are deposited on the substrate. The structure is then lithographically patterned and pre-etched (i.e., before the deposition of the magnetic stack) to form a patterned first seed layer. Then a separate second seed layer is deposited into the etched spaces where there is no first seed layer. The material of the magnetic stack is then deposited on the patterned seed layers, with magnetic material growing on the first seed layer and nonmagnetic material growing on the second seed layer. One example of this approach, as described in US 20100273028 A1 assigned to the same assignee as this application, has ruthenium (Ru) as the first seed layer and oxide spaces as the second seed layer. Magnetic CoPtCr material and nonmagnetic oxide material is then sputter deposited simultaneously, with the CoPtCr growing on the Ru seed layer and the oxide growing on the oxide seed layer. However, this prior art method is limited to templated growth of the data islands and the nonmagnetic spaces between the data islands in the data regions of the disk, and not to the nondata servo regions of the disk.

Like conventional non-patterned or continuous-media disks, BPM disks also have nondata servo regions that are used for read/write head positioning, and to identify the track being written or read. The servo regions in the pre-etched type of BPM disks with elevated spaced-apart data pillars can also patterned to contain elevated nondata servo islands or pillars that are separated by servo trenches. The servo pillars are "servowritten" or pre-magnetized during manufacturing and are not intended to be rewritten during normal operation of the HDD.

The pattern of servo pillars and trenches differs significantly from the uniform periodic pattern of the data pillars and data trenches. There are different sizes and shapes of servo pillar features and the servo trenches are typically much wider than the data trenches. To generate an adequate servo signal the magnetic field above the servo pillar features at the height of the read sensor must be significantly different from the magnetic field above the etched regions. In BPM disks made by etching the magnetic stack, the magnetic material is removed in the etched part of the servo pattern, which results in the desired magnetic contrast at the read head height. However, because of the wide servo trenches as compared to the very narrow data trenches, the prior art templated growth method, which relies on very narrow data trenches to attract the nonmagnetic material, will not result in a servo pattern that can deliver an adequate servo signal. Also, the difference in topography between the data regions and the servo regions can cause a change in the air flow under the slider that supports the read/write head as the slider moves past the data regions and servo regions. This can cause modulations in the slider flying height, and thus magnetic spacing modulations that degrade the performance of the recording system. Thus to create a reliable head-disk interface, expensive extra process steps, such as planarization, may be necessary for BPM disks.

What is needed is a magnetic recording disk with patterned servo regions that can generate an adequate servo signal and that can be fabricated using the advantages of a templated growth method.

SUMMARY OF THE INVENTION

Embodiments of the invention relate to a perpendicular magnetic recording disk with patterned servo regions. The servo regions have a patterned underlayer with seed layer pillars formed on the underlayer pillars above the underlayer trenches. The underlayer is made of an oxidizable material and the seed layer is made of a material substantially non-reactive with oxygen. Magnetic recording material is located on the seed layer pillars and on an oxide layer in the underlayer trenches. The magnetic material in the trenches exhibits a magnetic field substantially less than the magnetic field exhibited by the magnetic material on the seed layer pillars, which has perpendicular magnetic anisotropy. The reduced magnetic field in the trenches results from structural differences between the magnetic material on the seed layer pillars and the magnetic material in the trenches, such as smaller grain size of the magnetic material on the seed layer pillars and a wider distribution of crystallographic axes of the magnetic material in the trenches. Additionally, the magnetic field contrast can occur because of composition difference between materials in the seed layer and trenches that can occur during growth with appropriate choice of sputtered materials and engineering of the seed layer and trenches.

In one embodiment the seed layer may be one or more of Pt, Pd, Rh, Ir and Au and the magnetic material may comprise the elements Co, Pt and Cr, with these elements forming a hexagonal-close-packed (hcp) CoPtCr alloy on the seed layer pillars. The magnetic material may also comprise additional elements of Pd and Ni. A ruthenium (Ru)-containing layer may be located on the seed layer pillars and in the underlayer trenches below the magnetic material.

Embodiments of the invention also relate to a templated growth method for forming the patterned servo regions.

For a fuller understanding of the nature and advantages of the present invention, reference should be made to the following detailed description taken together with the accompanying figures.

DETAILED DESCRIPTION OF THE INVENTION

Figure 1:
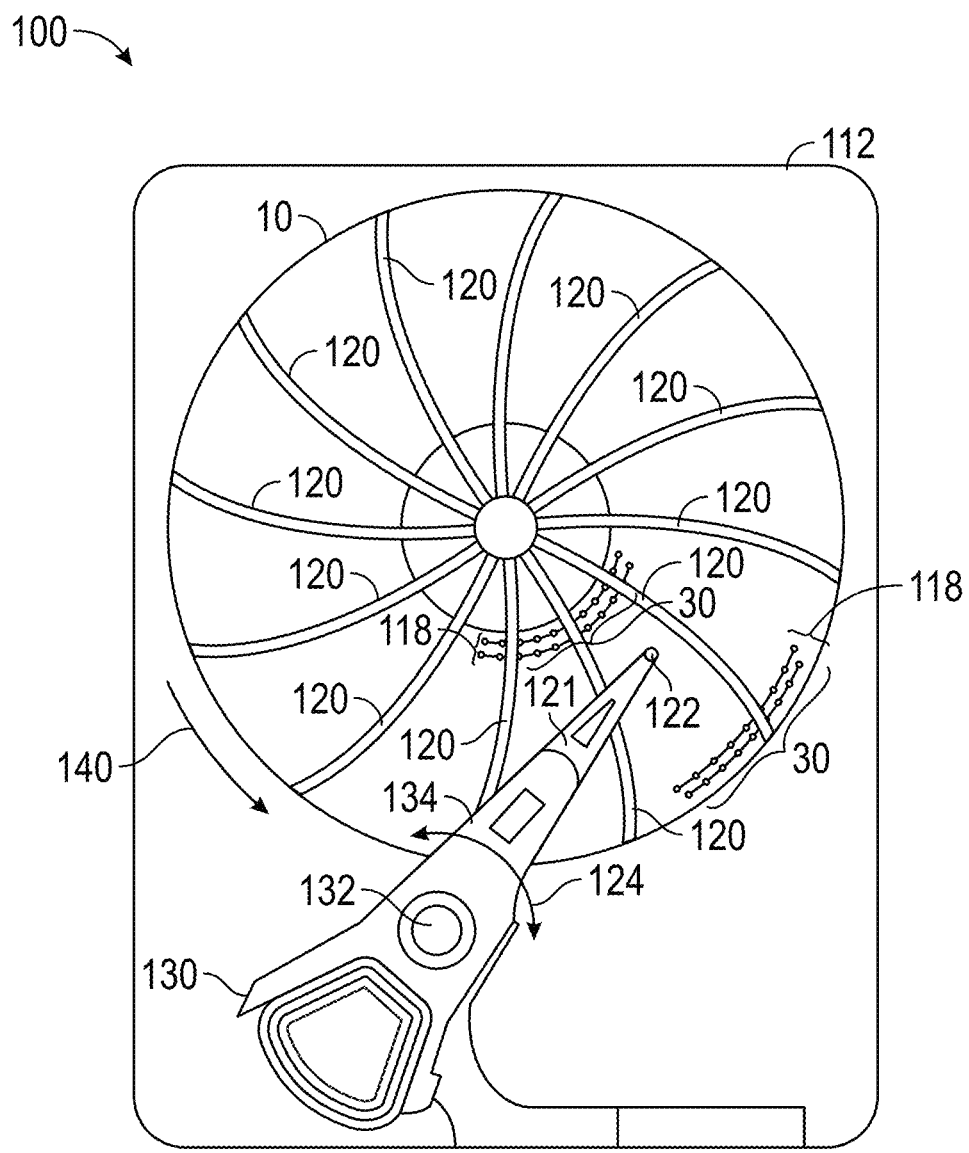
FIG. 1 is a top view of a disk drive implementation of the system illustrated in FIG. 1 and shows the patterned bits arranged in radially-spaced data tracks.

FIG. 1 is a top view of a perpendicular magnetic recording disk drive 100. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head and write head (not shown) are typically formed as an integrated read/write head (not shown) patterned on the trailing surface of the head carrier 122. The data pillars 30 on disk 10 are arranged in radially-spaced data tracks 118. The pillars 30 are spaced apart, leaving troughs or trenches recessed below the ends of the pillars 30. As the disk 10 rotates in the direction of arrow 140, the movement of actuator 130 allows the read/write head on the trailing end of head carrier 122 to access different data tracks 118 on disk 10.

Each data track 118 also includes a plurality of circumferentially or angularly-spaced patterned servo regions or sectors 120 that contain positioning information detectable by the read head for moving the read/write heads to desired data tracks and maintaining the heads on the data tracks. The servo sectors in each track are aligned circumferentially with the servo sectors in the other tracks so that they extend across the tracks in a generally radial direction, as represented by radially-directed servo sectors 120. In conventional disk drives the servo sectors 120 are nondata regions that contain servo information not intended to be re-written during normal operation of the disk drive. The servo information is written in a separate servowrite process using a conventional magnetic writer to generate the desired magnetic pattern. The servowrite process is slow and costly.

In this invention, the servo sectors contain servo pillars and servo trenches. The magnetic state of the servo pillars and trenches can be set globally by magnetizing the entire disk one or more times in a magnetic field. To set the servo pillars a magnetic field that exceeds the coercivity of the servo pillars (typically >8 kOe) may be employed. In the perpendicular magnetic recording system with the patterned disk 10 as shown in FIG. 1, only the perpendicular magnetic recording layer on the ends of the data pillars 30 contributes to the data readback signal, with each data pillar 30 representing one bit. It is undesirable to have magnetic material located in the data trenches.

Figure 2:
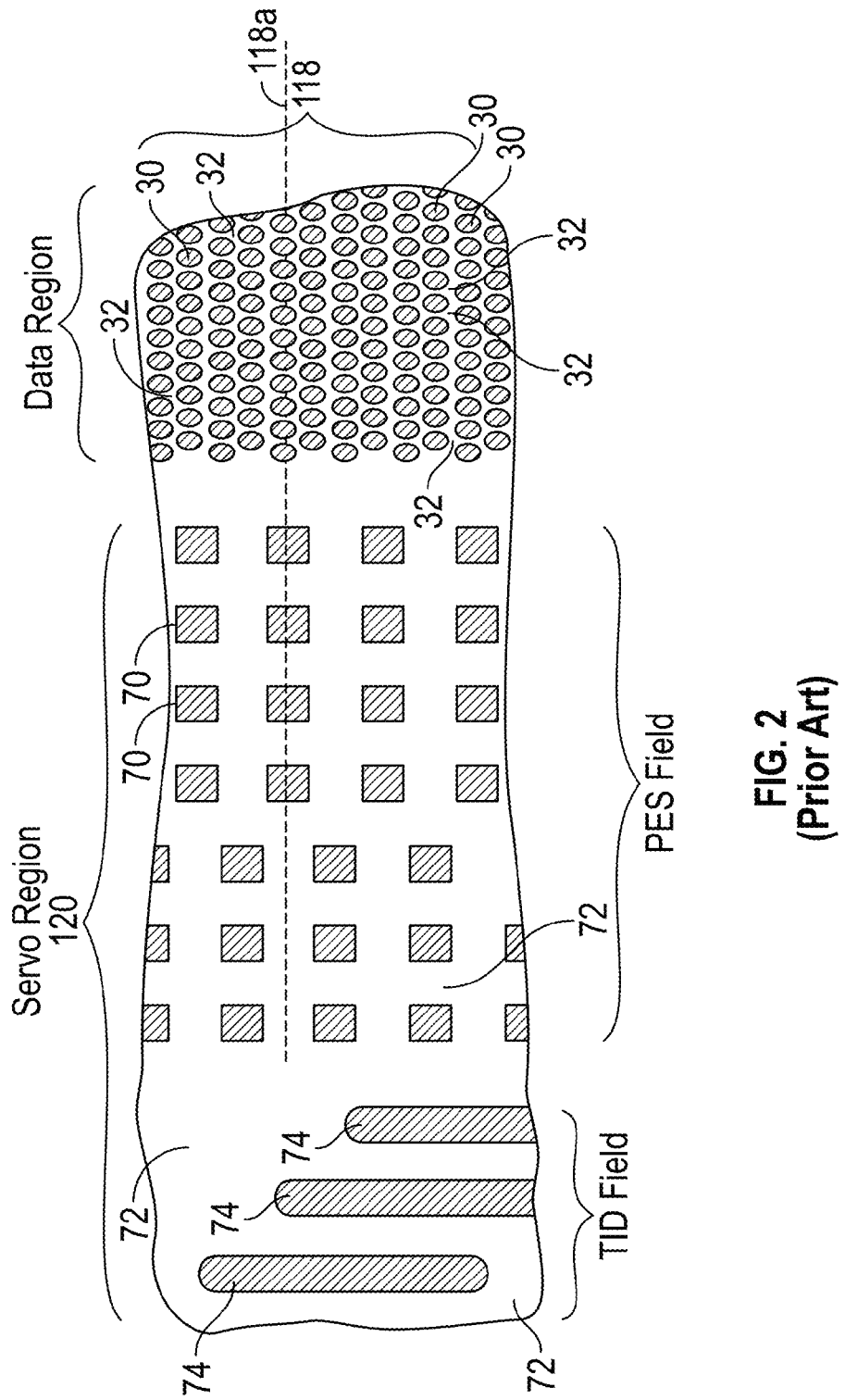
FIG. 2 is a top view of a bit-patterned media (BPM) disk showing an enlarged portion of a servo region with servo pillars and trenches adjacent to a data region with data pillars and trenches.

FIG. 2 is a top view of disk 10 showing an enlarged portion of a servo region or sector 120 adjacent to a portion of a data region with data tracks 118 with data pillars 30 and data trenches 32 according to this invention. The servo sector 120 includes servo pillars 70, 74 that are spaced-apart to define servo trenches 72. The servo pillars 70, 74 and trenches 72 are arranged in a pre-determined pattern that is used to generate the position error signal (PES), track identification (TID), timing signal and other servo information. As the disk moves past the read head along the dashed line corresponding to the centerline of data track 118a, the pattern of servo pillars passing the read head generates a servo signal that is used to control the actuator 130 (FIG. 1) to maintain the read head or write head on the data track centerline 118a. However, the servo regions also include other fields of different sizes and shapes with different spacings, such as the track identification (TID), which is typically Gray-coded. Servo pillars 74 represent portions of Gray-coded TID field. As is apparent from FIG. 2, the servo pillars 70, 74 have a wide range of sizes and shapes and form an irregular pattern, as compared to the uniform regularly spaced data islands 30 in the data region. The largest dimension of the servo pillars 70, 74 can be in the range of 20 to 200 nm while the width of the data pillars 30 is typically about 3 to 30 nm. The width of the servo trenches 72 can be in the range of 5 to 200 nm while the width of the data trenches 32 (the spacing between the data pillars 30) is typically only about 5 nm. Because magnetic material will be deposited onto both the servo pillars and into the servo trenches the relatively wide servo trenches present a challenge to generating a sufficiently different magnetic field above the servo pillars and servo trenches. Also, the different fill factors (ratio of the pillar feature area to the total area) and other topographical variation between the data regions and servo regions can result in modulations in the slider flying height, and thus magnetic spacing modulations that degrade the performance of the reading and writing recording processes.

Figure 3A:
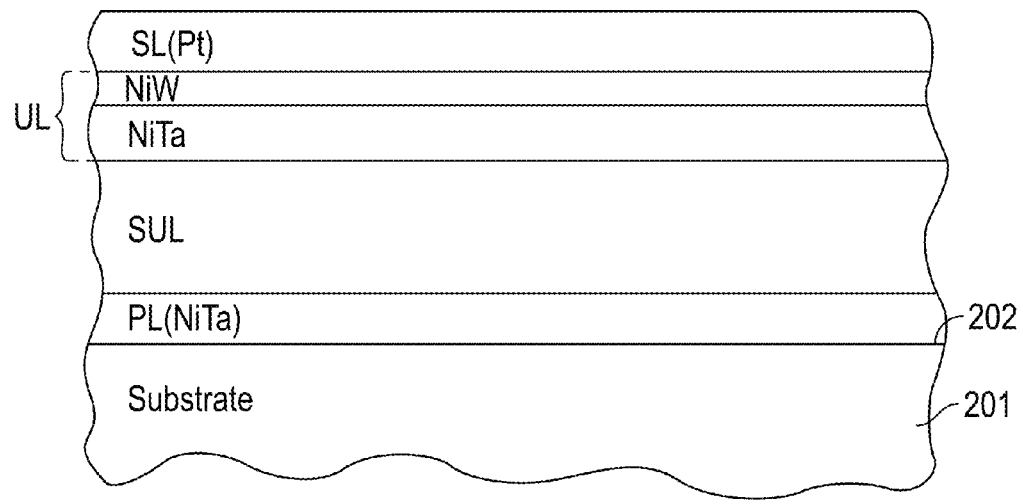
FIGS. 3A-3E are side sectional views of a portion of a servo region of a disk at various stages of an embodiment of the templated growth method of this invention.

FIGS. 3A-3E are side sectional views of a portion of a servo region of a disk at various stages of an embodiment of the templated growth method of this invention. FIG. 3A is a sectional view showing the structure before lithographic patterning. The disk substrate 201 has a generally planar surface 202 on which the representative layers are deposited, typically by sputtering. The hard disk substrate 201 may be any commercially available glass substrate, but may also be a conventional aluminum alloy with a NiP surface coating, or an alternative substrate, such as silicon, canasite or silicon-carbide.

The optional SUL serves as a flux return path for the magnetic write field from the disk drive write head. If the substrate is glass a planarizing layer (PL), such as a layer of NiTa, may be formed on the substrate surface 202 prior to the deposition of the SUL. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

An underlayer (UL) is deposited on the SUL or other appropriate surface. In the example of FIGS. 3A-3E, the magnetic recording layer is a CoPtCr alloy, so the UL may be one or more layers of a material, like a NiTa, NiW or NiWCr alloy, with a thickness in the range of about 2 to 20 nm. In FIG. 3A, the UL is a bilayer of NiTa with a thickness in the range of 5 to 100 nm and NiW with a thickness in the range of 2 to 15 nm. The UL may be made of a material that will form oxides when exposed to the atmosphere.

A seed layer (SL) for the later growth of the magnetic recording material is deposited on the UL. The SL may be a material substantially non-reactive with oxygen. The SL may be a noble metal like one or more elements from the Pt group (Pt, Pd, Rh, Ir) and Au, i.e., one of these elements or alloys of two or more of those elements. The SL has a thickness in the range of about 1 to 20 nm.

For Co based magnetic recording layers, including alloys of CoPt like CoPtCr, CoPd and CoNi that require a hexagonal-close packed (hcp) orientation to achieve perpendicular anisotropy, the SL has a face-centered-cubic (fcc) crystalline structure and grows on top of the UL with the (111) plane normal to the layer growth direction. Additionally, materials with other than a fcc crystalline structure can be used for the SL, such as Ru and Ti, as is known in the art, to provide a surface structure and lattice parameter favoring the substantially epitaxial hcp growth of the above magnetic layers. The Co based alloy recording layers may also contain one or more segregants, such as oxides of one or more of Si, Ta and Ti and Cr.

The magnetic recording layer may also be formed of a substantially chemically-ordered FePt alloy, i.e., a FePt alloy with a composition of the form $Fe_{(y)}Pt_{(100-y)}$ where y is between about 45 and 55 atomic percent. This FePt alloy is ordered in $L1_0$ and is known for its high magneto-crystalline anisotropy and magnetization and is thus proposed for use in heat-assisted magnetic recording (HAMR) disk drives. The c-axis of the $L1_0$ phase is the easy axis of magnetization and is oriented perpendicular to the disk substrate. The FePt alloy recording layer may also include a segregant, such as one or more of $SiO_2$, $TiO_2$, $Ta_2O_5$, C, and BN that forms between the FePt grains and reduces the grain size. For this substantially chemically-ordered FePt alloy suitable materials for the SL include cubic materials that grow on top of the UL with the (002) orientation, such as MgO, TiN, RuAl, and TiC, Pt and Cr. If the SL is MgO, the UL may be NiTa. The magnetic recording layer may also be formed of a substantially chemically ordered CoPt alloy of the form $Co_{(x)}Pt_{(1-x)}$ where x is between about 0.45 and 0.55. The CoPt alloy is ordered in the L11 phase and is known for its high magnetocrystalline anisotropy. This magnetic alloy may use a segregant such as one or more of Si, Ta, Ti and C and their oxides.

Figure 3B:
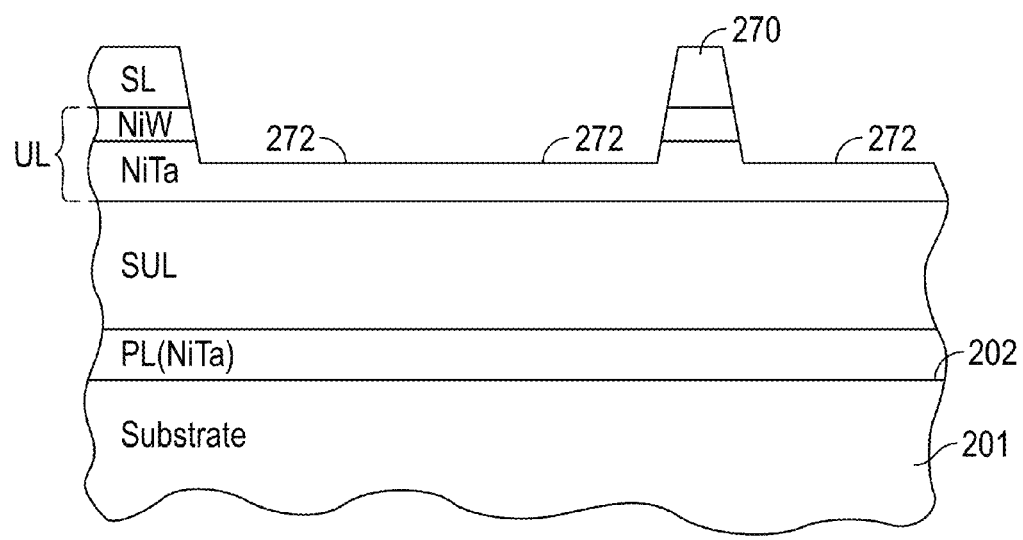

The disk structure of FIG. 3A is lithographically patterned, for example by a nanoimprinting process. In nanoimprinting, a master template is fabricated, for example by direct e-beam writing, to have the desired pattern of islands and nonmagnetic regions. A thin film of imprint resist (i.e., a thermoplastic polymer) is spin coated onto the SL. Then the master template with its predefined pattern is brought into contact with the imprint resist film and the template and disk structure are pressed together and heat is applied. When the imprint resist polymer is heated above its glass transition temperature, the pattern on the template is pressed into the resist film. After cooling, the master template is separated from the disk structure and the patterned resist is left on the SL. The patterned imprint resist is then used as an etch mask. Reactive-ion-etching (RIE) or ion milling can be used to transfer the pattern in the imprint resist to the underlying structure to form the data islands and nonmagnetic regions. The resulting patterned structure is shown in FIG. 3B after etching and removal of the resist, with servo pillars 270 of SL material and servo trenches 272 of UL material. The depth of the trenches is in the range of 2 to 10 nm.

Figure 3C:
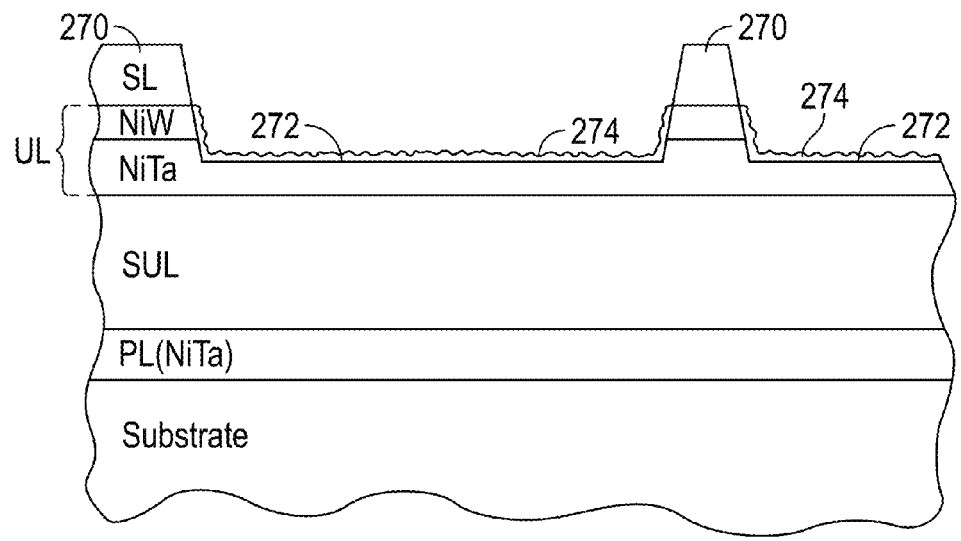

The structure of FIG. 3B is then exposed to oxygen, such as by exposure to the ambient atmosphere. As shown in FIG. 3C, this forms an oxide layer 274 of the UL material, for example oxides of W and Ta, in the servo trenches 272 and sidewalls of the upper NiW UL below the servo pillars 270. Because the SL material is non-reactive with oxygen, no oxides are formed on the SL pillars 270. The oxidation of the UL material in the trenches will cause swelling in the trenches and growth of the oxide layer 274. This will reduce the depth of the servo trenches 272 and thus reduce the topography variation between the pillars and the trenches. The swelling may cause the oxide layer 274 to grow in thickness to be at least within 4 nm from the top of the SL. Alternatively, the SL material may be oxidizable but covered by a protective cover layer that prevents oxidation of the SL when the disk structure is removed from vacuum to form the lithographic mask. Processing then proceeds as described for the non-oxidizable SL, except that after etching of the servo trenches and oxidation of the UL material to form oxide layer 274, the cover layer is etched away to expose the SL. The oxidizable SL can be made of Ru, Ti, Ni and their alloys, Cu and its alloys, NiW and NiAl and any other material known to generate 002 growth of CoCrPt or other magnetic layers. The protective cover layer may be made of carbon, silicon nitride or other material that can be removed by milling or RIE.

Figure 3D:
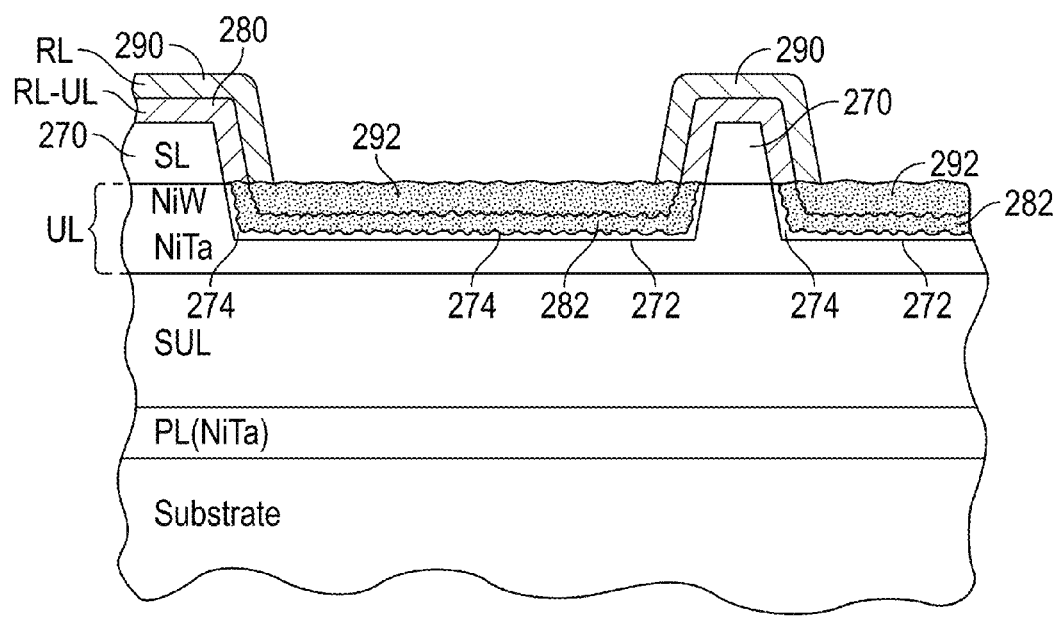

Next, as shown in FIG. 3D, because the magnetic recording layer in this example is CoPtCr, a recording layer underlayer (RL-UL) may be deposited on the servo pillars 270 and the oxide layer 274 in the servo trenches 272, followed by recording layer (RL) material on the RL-UL. The RL may also be comprised of more than one layer, and may contain both magnetic and nonmagnetic layers to achieve the desired magnetic properties. The RL-UL is preferably a ruthenium (Ru)-containing material, preferably Ru or a Ru alloy like RuCr or nonmagnetic RuCo, with a thickness in the range of about 5 to 30 nm, or may be a material as described below that improves the crystallographic orientation of subsequent layers, and may do so by 'healing' the damage to the SL caused by the etching process. The RL-UL forms a layer 280 on the top and sidewalls of servo pillars 270 that grows with the desired crystalline orientation since it is deposited on the fcc SL. However, the RL-UL material forms a layer 282 in the servo trenches 272 that causes the magnetic material in the servo trenches to exhibit a lower magnetic field than the magnetic material on the servo pillars as measured from the same location above the disk surface, e.g., as detected by the read head. The RL material forms a layer 290 on the servo pillars and a layer 292 on the servo trenches. The reduced magnetic field of layer 292 can arise for a number of structural differences between the materials formed on the servo pillars and servo trenches. These include diffusion of a subset of RL elements away from the pillars toward the trenches or away from the trenches to the pillars, the chemical reaction of the RL-UL with material on the surface of the trenches 272, or diffusion of material at or below the surface of the trenches 272 into the RL-UL that causes a change in the magnetization or anisotropy of the RL.

The reduced magnetic field of layer 292 can also be a result of smaller RL grain size, or larger variation in the direction of magnetization of the RL grains, i.e., a wider distribution of crystallographic axes of the RL material. If the average grain size of the RL material in the servo trenches is less than half the average grain size of the RL on the servo pillars, there will be an adequate difference in magnetic field exhibited between the servo trenches and servo pillars. If the distribution of crystallographic axes of the RL material in the servo trenches, as measured by X-ray diffraction, is at least twice that of the RL material on the servo pillars, there will be an adequate difference in magnetic field exhibited between the servo trenches and servo pillars.

These structural differences can arise from a variety of phenomena. Smaller RL grain size and large variation in magnetization direction of grains can occur because the servo trenches 272 and oxide layer 274 will have a surface roughness. The chemical reaction of elements in the RL can occur for example when an RL element has a stronger heat of formation of oxide compared with the servo trench surface, as could occur between Ta from CoCrTa media and a surface that includes NiW oxide. In another example, FePt media can be deposited on a hot disk to encourage chemical ordering of the Fe and Pt atoms, and the disk can contain a Cr containing underlayer that is exposed in the trench 272 or in a layer just below the trench surface. As part of the deposition process on the hot disk the Cr may diffuse into the FePt, greatly reducing its magnetization and disrupting its chemical order, resulting in a FePt layer with lower magnetization and lower anisotropy in the trench region. The RL may be a Co alloy, preferably a CoPtCr alloy, with a thickness in the range of about 4 to 15 nm. The RL material forms a layer 290 on the tops and sidewalls of servo pillars 270 that grows with the desired hexagonal-close-packed (hcp) crystalline orientation with its c-axis perpendicular to the RL, and will thus have perpendicular magnetic anisotropy. However, the RL material forms a layer 292 in the servo trenches 272 with less preferred crystalline orientation. This is because it is not deposited on a RL-UL material with a crystalline orientation that will encourage the proper growth of the RL. Thus the recording layer material in layer 292 will have reduced magnetic moment perpendicular to the disk surface and will thus generate a magnetic field that can be distinguished from the magnetic field generated by the magnetic material in layer 290 above the servo pillars. Also, the Ru-containing layer 280 deposited on large grain Pt (111) pillars 27 will have large Ru grains, which results in large grain growth of the RL with a high coercivity and high thermal stability; while the Ru-containing layer 282 deposited on oxidized surfaces like oxide layer 274 will have a smaller grain size, which results in small magnetic grains with much lower coercivity.

As noted above, the deposition of the RL or UL-RL may be preceded by deposition of a healing layer on the SL and servo trenches. The healing layer acts to aid in maintaining and improving the crystallographic orientation and lattice constant of the SL layer after the etching process. Additionally, the healing layer makes growth in the trenches more uniform, resulting in a more uniform magnetic field. The healing layer may be made of the same materials as the SL, or when the SL is Pt the healing layer may be Pt, Ir, Rh, Pd or their alloys.

The disk with the templated growth of the RL in the servo regions according to embodiments of the invention is preferably a BPM disk that also has patterned data regions. As shown in FIG. 2, the data regions will have data pillars 30 and data trenches 32. However the data pillars 30 are much more closely spaced than the servo pillars 70, 74. Referring to FIG. 2 for explanation, when the RL-UL and RL materials are deposited in the data regions, the magnetic material will be only partially or incompletely deposited in the data trenches 32, so that the material in the data trenches 32 is either essentially nonmagnetic or contains a significantly reduced and therefore disconnected amount of magnetic material compared to the relatively wide servo trenches 72. When a non-ferromagnetic segregant is used, it generally will collect in the data trenches and will ensure minimal magnetic exchange between data pillars by excluding magnetic material from the data trenches. The disk with the templated growth of the RL in the servo regions according to embodiments of the invention may also be used in a conventional granular media disk where the data regions are not patterned into a periodic array (as is required for BPM). In this type of disk only the servo regions would be patterned so that the top of the RL in the data regions would be essentially coplanar with the tops of the RL on the servo pillars in the servo regions.

Figure 3E:
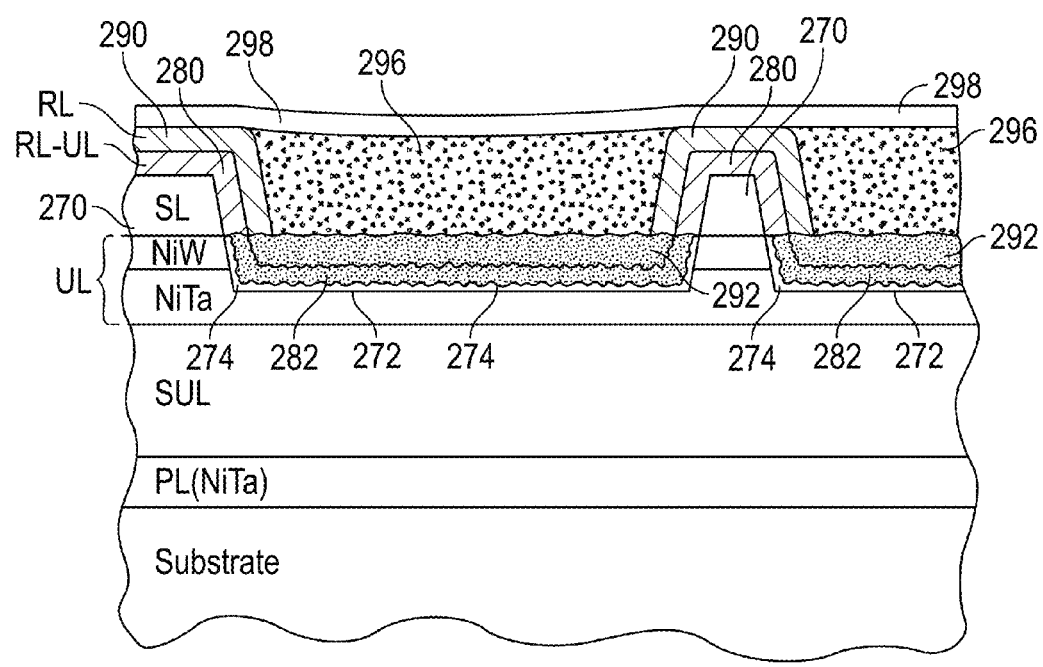

FIG. 3E is a sectional view of the disk structure of FIG. 4E after optional planarization by deposition of planarizing fill material 296 in the trenches 272, followed by deposition of a protective overcoat (OC) 298. The fill material 296 may be $SiO_2$ or a polymeric material, or a nonmagnetic metal, like Ta. Planarization may not be necessary if swelling of the servo etch areas brings the top of the servo etch region below but sufficiently close (within 4 nm) to the top of the SL. The OC may be sputter-deposited amorphous carbon, like DLC, which may also be hydrogenated and/or nitrogenated. Other materials that may be used for the OC include carbon, carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta2O_5$ and $ZrO_2$—$Y_2O_3$; and mixtures of these materials.

Figure 4:
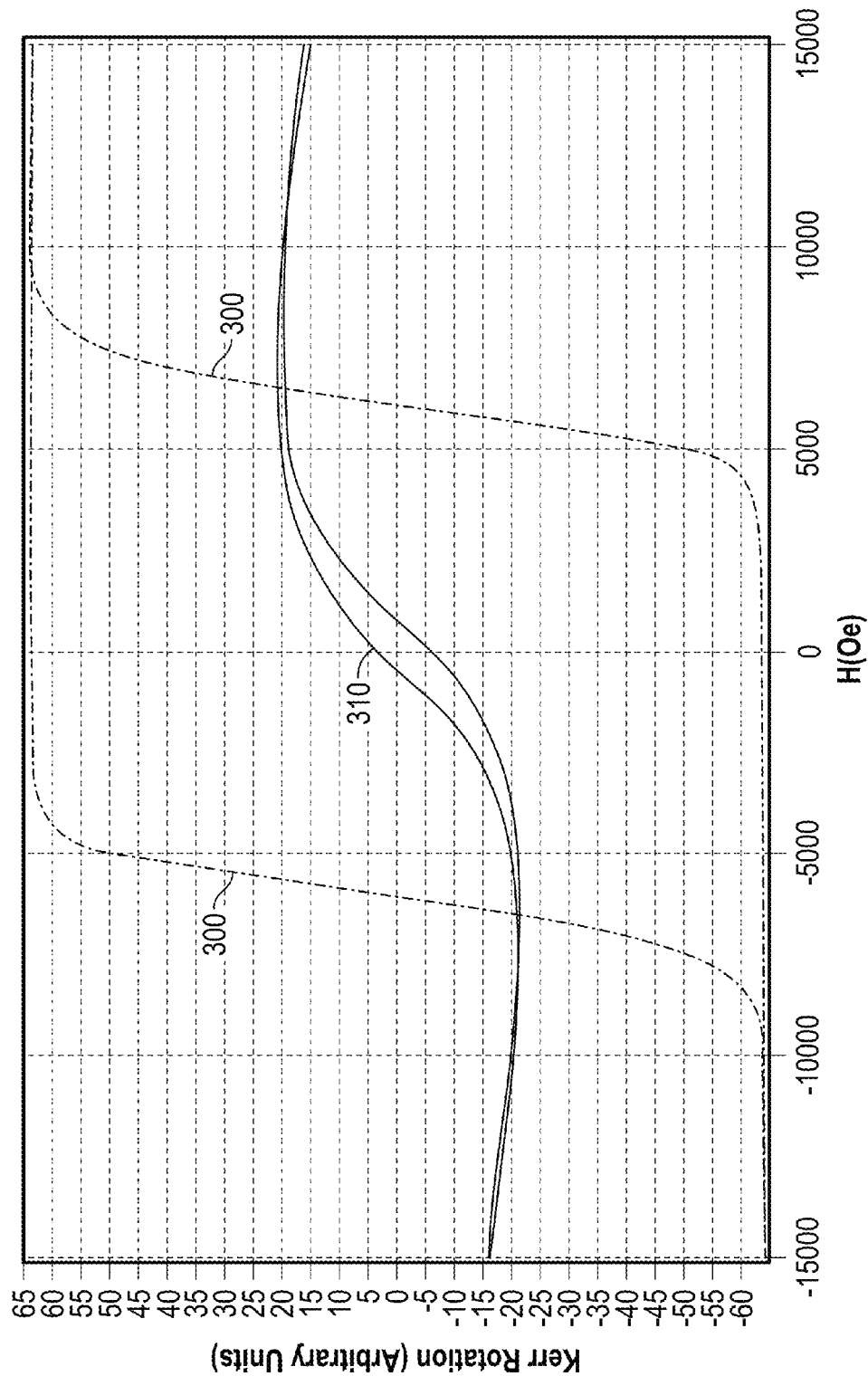
FIG. 4 are magnetic hysteresis loops from polar Kerr measurements of a disk containing Ru/CoCrPt+oxide segregant layers deposited on etched highly oriented Pt pillars, and a hysteresis loop of the same material deposited on oxidized NiW/NiTa.

In one embodiment of the templated growth method, Co, Cr and Pt and an oxide segregant of $SiO_2$ and other oxides were sputtered deposited over a Ru layer. FIG. 4 shows a magnetic hysteresis loop 300 from polar Kerr measurements of the deposited Ru/CoCrPt+oxide layers on etched highly oriented Pt pillars. FIG. 4 also shows a magnetic hysteresis loop 310 of the same Ru/CoCrPt+oxide layers deposited on oxidized on NiW/NiTa. The magnetic layers deposited on the Pt (111) pillars have excellent perpendicular orientation, while the layers deposited on the etched oxide layer do not encourage perpendicular texture, and will thus generate grains with a range of crystallographic axes and will exhibit soft magnetic properties. The magnetic layer on the pillars exhibit high coercivity, large saturation magnetization (as indicated from the Kerr rotation), and near unity remanence, while the layers on the oxide trench material exhibit much lower coercivity, significantly less magnetic field at read head distance above and very low remanence.

Figure 5:
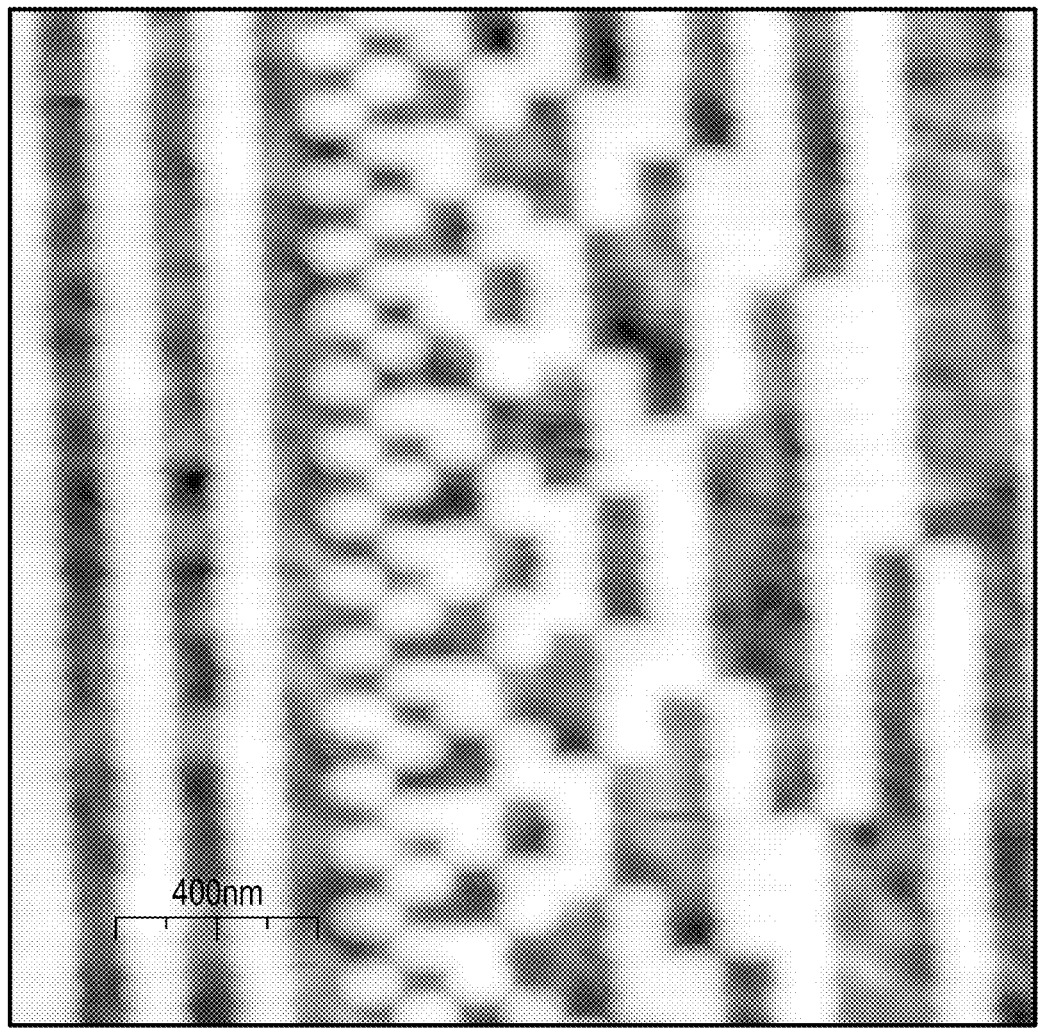
FIG. 5 is a magnetic force microscopy (MFM) image of a disk generated by templated growth containing Ru(9 nm)/CoCrPt+oxide segregant (8 nm) layers deposited on highly oriented, large-grained Pt pillars in a matrix of an etched oxide surface.

FIG. 5 is a magnetic force microscopy (MFM) image of templated growth of Ru(9 nm)/CoCrPt+oxide (8 nm) layers deposited on highly oriented, large-grained Pt pillars in a matrix of an etched oxide surface formed from a typical servo pattern. The disk was initialized in a DC magnetic field of 1.7 Tesla. As is apparent from FIG. 5, a large contrast exists between the magnetic signals from the servo pillars (the lighter areas) and servo trenches (the darker areas), as is desired for the read head to accurately detect the servo pattern.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk having data regions and servo regions comprising:
a substrate;
an underlayer on the substrate, the underlayer in the servo regions being patterned into servo pillars and servo trenches;
a seed layer on the underlayer pillars, the seed layer being material different from the material of the underlayer; and
magnetic recording material with perpendicular magnetic anisotropy on the seed layer and magnetic recording material on the underlayer trenches, the magnetic material on the seed layer and on the trenches containing the same elements, the magnetic material on the servo trenches exhibiting a magnetic field less than the magnetic material on the seed layer.

2. The disk of claim 1 wherein the underlayer material is selected from an alloy of Ni and Ta, an alloy of Ni and W and an alloy of Ni, W and Cr.

3. The disk of claim 2 wherein the underlayer comprises a bilayer of a NiTa alloy layer and a NiW alloy layer on the NiTa alloy layer.

4. The disk of claim 1 wherein the seed layer is selected from one or more of Pt, Pd, Rh, Ir and Au.

5. The disk of claim 4 further comprising a healing layer of the same material as the seed layer on the seed layer.

6. The disk of claim 1 further comprising a Ru-containing layer on the seed layer below the recording material and on the underlayer trenches.

7. The disk of claim 1 wherein the elements of the magnetic recording material comprise Co, Pt and Cr.

8. The disk of claim 1 wherein the magnetic recording material comprises Fe and Pt and wherein the magnetic recording layer on the seed layer is substantially chemically-ordered FePt having a $L1_0$ crystallographic phase.

9. The disk of claim 1 wherein the seed layer is formed of material substantially non-reactive with oxygen.

10. The disk of claim 1 wherein the underlayer material is oxidizable and further comprising an oxide of the underlayer material on the underlayer trenches.

11. The disk of claim 10 wherein the underlayer oxide material has a thickness within 4 nm of the top of the seed layer.

12. The disk of claim 1 wherein the underlayer in the data regions of the disk is patterned into data pillars and data trenches, wherein the seed layer is also on the data pillars, and wherein the magnetic recording material with perpendicular magnetic anisotropy is also on the seed layer on the data pillars.

13. The disk of claim 1 wherein the average grain size of the magnetic recording material in the servo trenches is less than half the average grain size of the magnetic recording material on the seed layer.

14. The disk of claim 1 wherein the distribution of crystallographic axes of the magnetic recording material in the servo trenches is at least twice that of the magnetic recording material on the seed layer.

15. A bit-patterned media (BPM) perpendicular magnetic recording disk having data regions and servo regions comprising:
a substrate;
an underlayer of oxidizable material on the substrate, the underlayer being patterned into data pillars and data trenches in the data regions and into servo pillars and servo trenches in the servo regions, wherein at least some of the servo trenches are substantially wider than the data trenches;
a seed layer of material substantially non-reactive with oxygen and selected from one or more of Pt, Pd, Rh, Ir and Au on the underlayer data pillars and servo pillars;
a layer of oxide of underlayer material in the data trenches and servo trenches;
a Ru-containing layer on the seed layer and on the layer of oxide underlayer material;
magnetic recording material with perpendicular magnetic anisotropy on the Ru-containing layer and magnetic recording material on the oxide underlayer material, the magnetic material on the Ru-containing layer and on the oxide underlayer material and containing the same elements comprising Co, Pt and Cr, the magnetic material on the oxide underlayer material exhibiting a magnetic field less than the magnetic material on the Ru-containing layer.

16. A method for making a perpendicular magnetic recording disk having data regions and patterned servo regions comprising:
providing a substrate;
depositing an underlayer of oxidizable material on the substrate;
depositing on the underlayer a seed layer of material different from the material of the underlayer and substantially non-reactive with oxygen;
patterning the seed layer and underlayer in the servo regions to a depth greater than the thickness of the seed layer to form servo pillars of seed layer material and servo trenches in the underlayer material;
exposing the patterned seed layer and underlayer to oxygen to form oxides in the servo trenches;
depositing magnetic recording material on the seed layer servo pillars and the oxides in the servo trenches to form magnetic recording material with perpendicular magnetic anisotropy on the seed layer servo pillars and magnetic recording material on the underlayer trenches, the magnetic material on the underlayer trenches exhibiting a magnetic field less than that exhibited by the magnetic material on the seed layer servo pillars.

17. The method of claim 16 wherein depositing an underlayer comprises depositing an underlayer material selected from an alloy of Ni and Ta, an alloy of Ni and W and an alloy of Ni, W and Cr.

18. The method of claim 16 wherein depositing a seed layer comprises depositing a seed layer selected from one or more of Pt, Pd, Rh, Ir and Au.

19. The method of claim 16 wherein depositing magnetic recording material comprises depositing Co, Pt and Cr.

20. The method of claim 16 wherein depositing magnetic recording material comprises depositing Fe and Pt and wherein the magnetic recording material with perpendicular magnetic on the seed layer servo pillars comprises substantially chemically-ordered FePt having a $L1_0$ crystallographic phase.

* * * * *

UNITED STATES PATENT AND TRADEMARK OFFICE
CERTIFICATE OF CORRECTION

| | | |
|---|---|---|
| PATENT NO. | : 8,824,084 B1 | Page 1 of 1 |
| APPLICATION NO. | : 14/263132 | |
| DATED | : September 2, 2014 | |
| INVENTOR(S) | : Bruce Alvin Gurney and En Yang | |

It is certified that error appears in the above-identified patent and that said Letters Patent is hereby corrected as shown below:

In the Claims,

In column 10, line 62, after the word "magnetic" and before the phrase "on the seed layer", insert the word --anisotropy--.

Signed and Sealed this
Thirtieth Day of December, 2014

Michelle K. Lee
*Deputy Director of the United States Patent and Trademark Office*